United States Patent [19]

Davidson et al.

[11] 4,344,100

[45] Aug. 10, 1982

[54] GROUND FAULT CIRCUIT BREAKER WITH GROUND FAULT TRIP INDICATOR

[75] Inventors: Ronnie D. Davidson, Bridgeport; John J. Misencik, Shelton, both of Conn.

[73] Assignee: Westinghouse Electric Corp., Pittsburgh, Pa.

[21] Appl. No.: 175,976

[22] Filed: Aug. 7, 1980

[51] Int. Cl.³ .............................................. H02H 3/33
[52] U.S. Cl. ...................................... 361/45; 361/115; 340/644
[58] Field of Search ...................... 361/45, 44, 46, 115, 361/100, 93–98; 340/635, 644, 651, 654, 664; 335/18, 17

[56] References Cited

U.S. PATENT DOCUMENTS

| 4,004,201 | 1/1977 | DePuy | 361/96 |
| 4,081,852 | 3/1978 | Coley et al. | 361/45 |
| 4,223,365 | 9/1980 | Moran | 361/96 X |
| 4,250,532 | 2/1981 | Davis | 361/96 |

*Primary Examiner*—Patrick R. Salce
*Attorney, Agent, or Firm*—G. H. Telfer

[57] ABSTRACT

A ground fault circuit breaker including ground fault interruption means and overload interruption means that are independently responsive to open a common set of breaker contacts upon respective ground fault and overload conditions with a trip indicator visible external to the breaker that operates on actuation of the ground fault interruption means but not upon operation of the overload interruption means with means for electrically actuating the trip indicator upon occurrence of a ground fault condition that actuates the ground fault interruption means.

3 Claims, 2 Drawing Figures ived for overload current protection are combined with the elements of a ground fault interrupter and packaged together for location at a load center. A representative example is that of Coley et al. U.S. Pat. No. 4,081,852, Mar. 28, 1978, which is incorporated by reference herein and describes an arrangement including a ground fault detector in side-by-side relation with a circuit breaker with interconnection therebetween so that breaker contacts are tripped open upon the occurrence of either a current overload condition or a ground fault condition.

GROUND FAULT CIRCUIT BREAKER WITH GROUND FAULT TRIP INDICATOR

BACKGROUND AND SUMMARY OF THE INVENTION

This invention relates to circuit breakers with ground fault interruption capability.

Ground fault circuit breakers are known in which the elements of a circuit breaker as normally devised for overload current protection are combined with the elements of a ground fault interrupter and packaged together for location at a load center. A representative example is that of Coley et al. U.S. Pat. No. 4,081,852, Mar. 28, 1978, which is incorporated by reference herein and describes an arrangement including a ground fault detector in side-by-side relation with a circuit breaker with interconnection therebetween so that breaker contacts are tripped open upon the occurrence of either a current overload condition or a ground fault condition.

Ground fault circuit breakers normally have an external handle for manual switching and for trip indication. The handle has ON, OFF, and TRIP positions so that upon a power interruption examination of the breaker will permit a user to readily determine if the breaker has tripped. Such apparatus has been widely and successfully used. It is the case, however, that a trip of the breaker is indicated in the same manner by the handle regardless of the cause of the trip, whether it be an overload condition or a ground fault condition.

A primary purpose of the present invention is to provide a ground fault circuit breaker with an indicator that shows the user if trip-out has been due to a ground fault condition, rather than an overload, so that any system condition causing a trip can be more readily identified and corrected.

Circuit breakers in accordance with the invention are provided with ground fault interruption means and overload interruption means, as heretofore, which are independently operable to open a common set of breaker contacts upon respective ground fault and overload conditions. A trip indicator that is visible external to the breaker is provided that appears only upon operation of the ground fault interruption means. The trip indicator may be a small light such as a light-emitting diode that is wired in circuit within the breaker and includes a series connection, with the light-emitting diode, including a mechanical switch arranged to close upon the opening of the breaker contacts upon either ground fault or overcurrent conditions and also including a non-mechanical, solid state, switch that becomes conductive only upon occurrence of a ground fault condition to turn on the light-emitting diode by conduction therethrough.

The solid-state switch is arranged to get a turn-on signal from the electronics which senses the occurrence of a ground fault condition. Normally this is derived from a differential current transformer as commonly used in ground fault interrupters in which the primary windings of the differential current transformer are in series with the system conductors and a sensing or secondary winding is also provided to detect current imbalance therebetween. The signals sensed on the sensing winding are normally amplified by an amplifier and then provided to a solid state switching device that energizes a trip coil for actuating the breaker trip mechanism, and, at essentially the same time, a turn-on signal is provided to the solid state switch in the indicator circuitry.

The mechanical switch in the indicating circuit branch ensures there is no power dissipation when the breaker is ON and, also, that the indicating circuit can be simply reset to OFF during the resetting of the breaker's handle. A single mechanical element that opens the breaker contacts is arranged to close the auxiliary switch.

DESCRIPTION OF THE PREFERRED EMBODIMENTS

Figure 1:
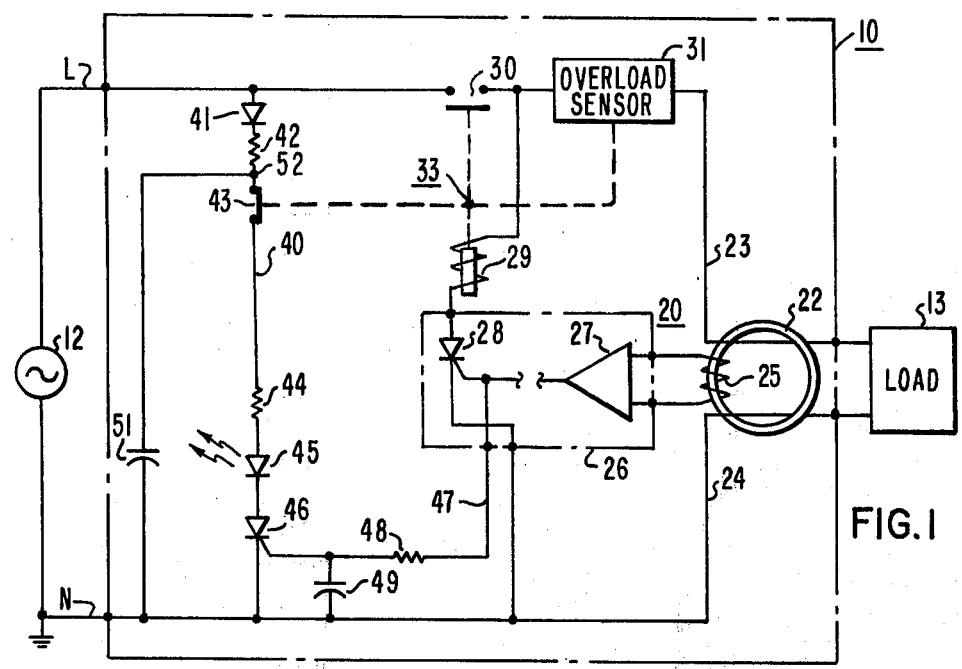
FIG. 1 is a circuit schematic of a ground fault circuit breaker in accordance with one embodiment of the present invention.

Referring to the drawing, FIG. 1 shows a ground fault circuit breaker 10 associated with an AC electrical distribution system between a supply 12 and a load 13. The system illustrated is the common single-phase, two-wire system including line and neutral conductors L and N with the neutral grounded proximate the supply. However, it will be understood that the invention applies as well to breakers of greater complexity for systems having three or more wires and two or more phases.

Ground fault interruption means 20 is provided which includes a differential current transformer including a magnetic core 22 with primary windings 23 and 24, each arranged for connection with respective ones of the conductors L and N of the AC distribution system, and a secondary sensing winding 25 on the core for sensing current imbalance between the primary windings. Sensed signals on the sensing winding 25 are provided to an electronic package 26 that normally includes an amplifier 27 and a solid-state switching device 28. An example of such circuitry may be found in Engel et al. U.S. Pat. No. 3,852,642, Dec. 3, 1974, which is herein incorporated by reference and the circuitry of that portion of the apparatus will not be fully detailed herein. The unit 26, normally referred to as a sense amplifier and trip circuit, amplifies the signal from the sensing winding 25 and may provide other functions such as time delay and signal integration before achieving a signal of predetermined magnitude that is sufficient to turn on the solid-state switch 28, commonly an SCR. The SCR 28 is connected with a solenoid trip coil 29 in a branch between the system conductors L and N so that upon its turn-on the trip coil is energized to result in opening breaker contacts 30.

Figure 2:
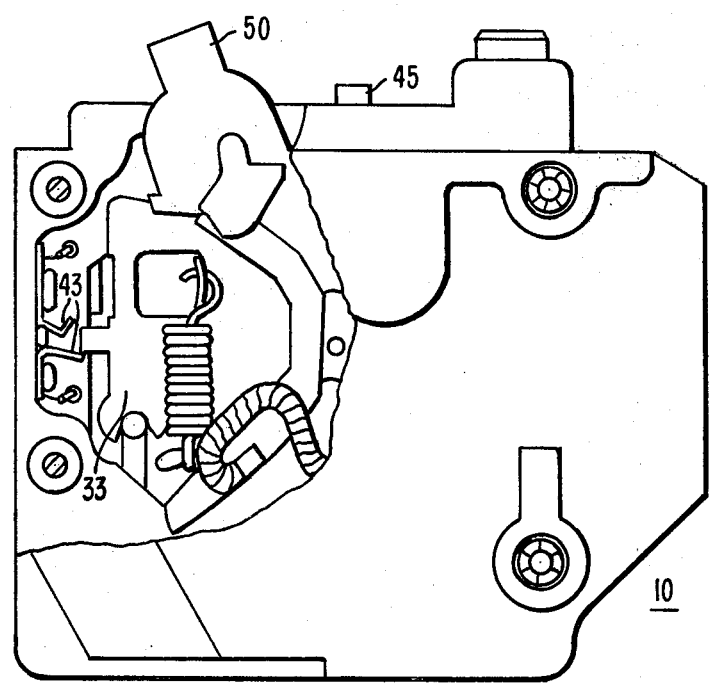
FIG. 2 is an elevation view of a ground fault circuit breaker in accordance with one embodiment of the present invention.

In addition, the breaker 10 includes an overload sensor 31 for sensing current overloads on the line conductor L. Overload sensor 31 may be a known type of thermal/magnetic device that also results in opening of the breaker contacts 30. Mechanical element or elements 33, such as is described in U.S. Pat. No. 4,081,852 and as shown in FIG. 2 herein, serves to open the breaker contacts 30 upon either a ground fault or a current overload.

The ground fault interruption means may be responsive to conditions other than ground fault from the line conductor L, the primary hazard to be protected against. For example, grounded neutral protection means, not illustrated, which may be in accordance with known practice, is normally included. What is referred to herein as a ground fault condition is any condition which results in the operation of the ground fault interruption means 20.

What has been described so far are the components that provide ground fault interruption means and overload interruption means for tripping a common set of breaker contacts upon either type of condition.

The additional elements of this invention, provided in combination and cooperating with those just previously described, include an additional circuit branch 40 connected between the system conductors L and N. In the illustrated embodiment, this circuit branch 40 includes a diode rectifier 41, a first resistor 42, a mechanical switch 43, a second resistor 44, a lighting device such as a light-emitting diode 45, and a solid-state switch 46 such as an SCR. The SCR 46 acquires its gate signal on a circuit line 47 connected to the trip circuit 26 through a third resistor 48 for receiving a gate signal at the SCR 46 when the trip circuit is energized. The trip indication circuitry also includes a capacitor 49 connected between the gate of the SCR 46 and the neutral conductor N and a capacitor 51 connected between point 52 and the neutral conductor.

The light-emitting diode 45 is the indicating element for a ground fault trip and is to be energized only upon the occurrence of a trip, or opening of the breaker contacts 30, that is due to a ground fault condition. Thus, the circuit branch 40 is normally non-conductive and hence draws no power. Upon occurrence of a breaker trip, the mechanical switch 43 is closed by mechanism 33. This switch may be conveniently provided by contacts 43 disposed within the circuit breaker as illustrated in FIG. 2 which are operable to close and become conductive upon the movement of the common breaker mechanical element 33 illustrated. The closing of switch 43 is thus not selective for only ground fault conditions.

If the trip is a result of an overload, and the mechanism is operated without the actuation of the ground fault interruption means 20, there is no ground fault signal from the sense winding, the SCR 46 is not made conductive, and the light-emitting diode remains non-illuminating. However, upon the occurrence of a trip resulting from a ground fault, a gate signal is supplied to the SCR 46 from the trip circuitry 26, and a conductive path is provided through the LED 45 which causes it to illuminate and to provide a visual indication on the exterior of the circuit breaker as indicated generally in FIG. 2.

In other words, when the breaker contacts 30 are closed and the breaker is ON, the auxiliary switch 43 is open and the circuit branch 40 is completely deenergized. However, one side of resistor 42 is charged to the input line voltage and will remain there. When a ground fault interruption takes place, due to SCR 28 turning on, there is also a gate signal applied to the SCR 46 making it conduct to a very low resistance at the time that the breaker contacts 30 open and the auxiliary switch 43 closes to result in lighting of the LED 45. The DC voltage on the capacitor 51 keeps the LED on. When the breaker is reset, the switch 43 in the auxiliary circuit is opened, causing the LED to go off upon the closing of breaker contacts 30. This would be effected by the normal switching of the handle 50 (FIG. 2) on the device from the TRIP position to the OFF position and then to the ON position in which the breaker contacts 30 are reclosed. During this time the capacitor 51 charges again to the input line voltage and remains there. On the other hand, when an overload condition occurs to cause the opening of the contacts of the breaker, the auxiliary switch closes but the LED is off because of the absence of a gate signal on the SCR 46.

Thus, various operational benefits are obtained including the visible indication of a trip-out due to a ground fault condition with no power dissipation of the indicating circuitry during the ON condition of the breaker thus providing long life for the indication circuitry and also with inherent reset of the indication circuitry to the OFF state during reset of the breaker's handle so as not to require any separate reset operation.

It is possible to employ the SCR 28 in the sense amplifier and trip circuitry 26 as the solid-state switch of the trip indication circuitry, without use of a second SCR 46. This may require some modification of the trip circuitry 26 from that previously used because in a trip condition there is leakage current through the trip coil that should not be allowed to exceed the limit set by Underwriters' Laboratories of 2 milliamperes. This current could be limited by suitable circuitry modification. In addition, there is a need to provide some direct current for the LED 45, and if it is turned on by the SCR 28 in the trip circuitry it will alter the characteristics of circuit 26 on ground fault which should be taken into account to provide any modification thereof. Presently for overall reliability and economy it is preferred to use two SCR's 28 and 46 in an embodiment such as that illustrated in FIG. 1, although the employment of a single SCR is not excluded.

The LED 45 can be replaced by any suitable electrically responsive indicator such as another form of light including a neon tube. A mechanical flag is not used, however, because the operation of the mechanical elements 33 is intended to be common between those causing ground fault trips and overload trips.

Thus, it is believed there has been shown a simple yet effective means for indicating a trip of the breaker contacts due to a ground fault that is not actuated by overload trips and it will be understood that the means for effecting same may be varied from that specifically disclosed in accordance with the skill of the art.

We claim:

1. A ground fault circuit breaker, with a trip indicator for ground fault trips that is not actuated by overload trips, comprising:

a differential current transformer including a magnetic core, a plurality of primary windings on said core, each being arranged for connection with respective ones of the conductors of an AC electrical distribution system between a supply and a load, and a secondary sensing winding on said core for sensing current imbalance between said primary windings;

breaker contacts, operated by a trip mechanism, in series with at least one of the system conductors;

first means for actuating said trip mechanism upon occurrence of a predetermined sensed signal on said sensing winding;

second means for actuating said trip mechanism upon occurrence of an overload through said at least one of the system conductors;

ground fault trip indication means for indicating a trip due to operation of said first means for actuating said trip mechanism comprising a circuit branch connected between the conductors which includes a mechanical switch and a non-mechanical switch connected in series, said mechanical switch being arranged to close upon the opening of said contacts in series with at least one of the system conductors, said non-mechanical switch being arranged to become conductive upon occurrence of a predetermined sensed signal on said sensing winding, and a static illuminating indicating device that is apparent external to the breaker providing an indication of the occurrence of both the closing of said mechanical switch and the conduction of said non-mechanical switch.

2. A ground fault circuit breaker in accordance with claim 1 wherein:

said first means for actuating said trip mechanism comprises an amplifier receptive of signals from said sensing winding, a non-mechanical switch receptive of signals from said amplifier, and a solenoid trip coil connected between said non-mechanical switch and said at least one of the system conductors;

said non-mechanical switch of said ground fault trip indication means is a switch in addition to said non-mechanical switch of said first means for actuating said trip mechanism and both receive signals from said amplifier.

3. A ground fault circuit breaker in accordance with either claim 1 or claim 2 wherein:

said trip mechanism comprises a unitary mechanical element that responds to both said first and second means for actuating said trip mechanism and effects both the opening of said breaker contacts and the closing of said mechanical switch of said ground fault trip indication means.

* * * * *